United States Patent [19]

Furukawa

[11] Patent Number: 5,730,001
[45] Date of Patent: Mar. 24, 1998

[54] ABSORPTION TYPE REFRIGERATING MACHINE

[75] Inventor: Masahiro Furukawa, Ohizumi-machi, Japan

[73] Assignee: Sanyo Electric Co., Ltd., Osaka, Japan

[21] Appl. No.: 757,301

[22] Filed: Nov. 27, 1996

[30] Foreign Application Priority Data

Nov. 29, 1995 [JP] Japan ..................... 7-311401

[51] Int. Cl.$^6$ ..................... F25B 15/00; F25B 37/00
[52] U.S. Cl. ..................... 62/485; 62/484; 62/494; 165/179; 165/DIG. 536; 165/DIG. 529
[58] Field of Search ..................... 62/476, 484, 485, 62/494; 165/179, 183, 177, DIG. 510, DIG. 529, DIG. 536

[56] References Cited

U.S. PATENT DOCUMENTS 5,577,555  11/1996  Hisajima et al. ..................... 165/133
5,590,711  1/1997  Ishida et al. ..................... 165/179

FOREIGN PATENT DOCUMENTS 58-200995  11/1983  Japan .
61-49267  4/1986  Japan .
403236561  10/1991  Japan ..................... 62/494

Primary Examiner—William Doerrler
Attorney, Agent, or Firm—Weingarten, Schurgin, Gagnebin & Hayes LLP

[57] ABSTRACT

A plurality of protrusions 32 are formed in a longitudinal direction on the outer surface of a heat transmission pipe, a convex portion 33 and a concave portion 34 adjacent thereto of each of the protrusions 32 are each in the form of a curved surface, the curvature radius of the concave portion 34 is made larger than the curvature radius of the convex portion 33, and a groove 34A is formed in the bottom of the concave portion so that the absorption solution dropping onto the heat transmission pipe 31 flows from the concave portion 34 over the convex portion 33 to the next concave portion 34 smoothly, the shifting of the absorption solution in the concave portion 34 is carried out smoothly, and Marangoni convections generated in the convex portion 33 and the concave portion 34 interfere with each other. The Marangoni convections are caused effectively by an easy entry of the absorption solution into the groove 34A, whereby a large turbulent function is produced in a pipe axial direction, the heat exchange efficiency of the heat transmission pipe 31 is greatly improved and the refrigerant vapor absorption power of the absorber is enhanced.

12 Claims, 10 Drawing Sheets

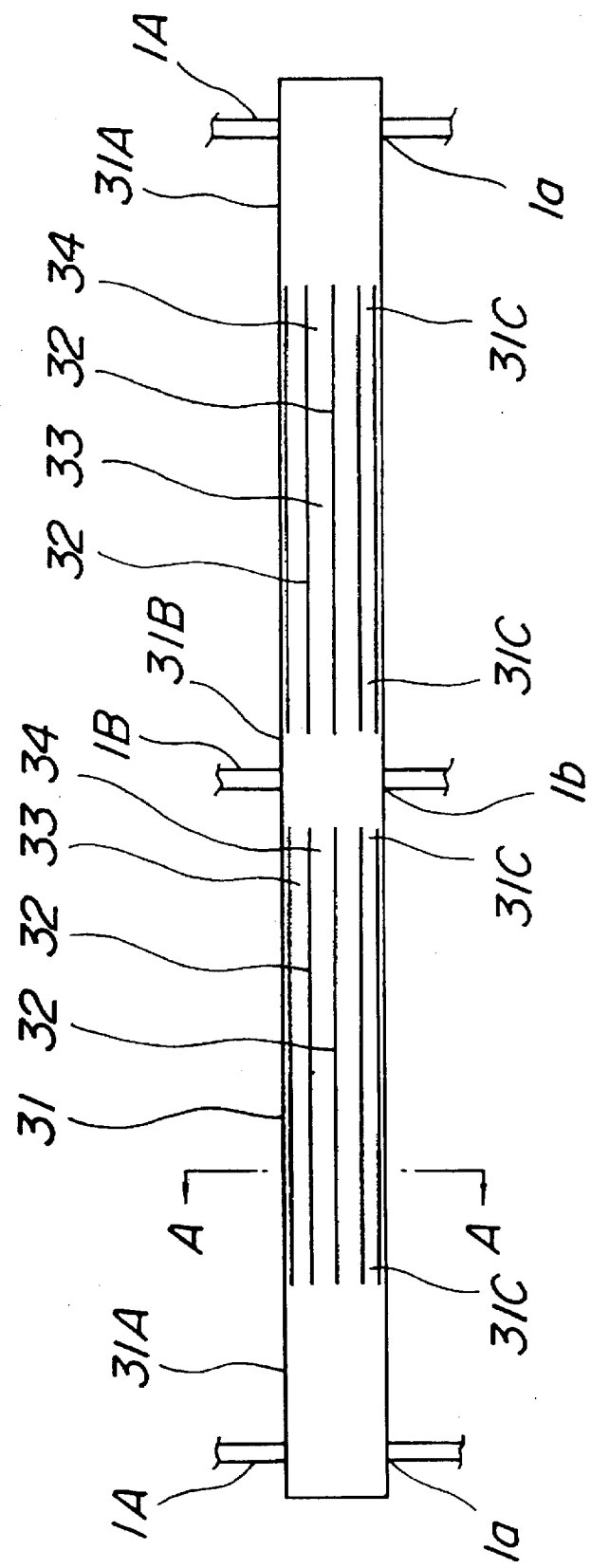

ABSORPTION TYPE REFRIGERATING MACHINE

BACKGROUND OF THE INVENTION

1. Field of the Invention

This invention relates to an absorption type refrigerating machine comprising an absorber having a plurality of heat transmission pipes for an absorber connected by piping.

2. Background Art

Laid-open Japanese Patent Application No. Sho 58-200995, for example, discloses a heat transmission pipe having a large number of protrusions formed in a longitudinal direction on the outer surface thereof and a convex portion and a concave portion adjacent thereto of which are in the form of a curved surface.

Laid-open Japanese Patent Application No. Sho 61-49267, for example, discloses an absorption type refrigerating machine equipped with a demister for distributing a concentrated absorption solution among cooling water heat exchangers formed of a plurality of heat transmission pipes stored in an absorber and having a smooth outer surface to change it into small particles.

In the above prior arts, if the curvature radius of the convex portion of each of a large number of protrusions is larger than the curvature radius of the concave portion and the curvature radius of the concave portion is extremely small, an absorption solution in the concave portion is difficult to move to the next concave portion. Therefore, heat exchange efficiency on the outer surface of the heat transmission pipe decreases and the absorber's absorption power of refrigerant vapor from the evaporator lowers. As a result, there is the possibility that the generation of the refrigerant vapor in the evaporator is suppressed, cooling power reduces, and operation efficiency deteriorates.

When the outer surface of each of the heat transmission pipes is smooth, the absorption solution is put to one side by surface tension and drops down, thereby reducing heat exchange efficiency on the outer surface of each of the heat transmission pipes. Therefore, to improve heat exchange efficiency, a demister, for example, needs to be provided between the heat transmission pipes, thereby increasing the size of the absorber with the result that a absorption refrigerating machine becomes bulky. Further, there is the possibility that each demister becomes resistance to the flow of the refrigerant vapor from the evaporator, thereby reducing the refrigerant vapor absorption power of the absorber with the result of reductions in cooling power and operation efficiency.

SUMMARY OF THE INVENTION

It is therefore an object of the present invention to improve the refrigerant vapor absorption power of the absorber and the operation efficiency of an absorption type refrigerating machine.

To solve the above problems, according to a first aspect of the present invention, an absorption type refrigerating machine in which a refrigerating cycle is constituted by connecting an absorber, a regenerator, a condenser and an evaporator by pipes and a large number of protrusions, each consisting of a concave portion and a convex portion and extending in a pipe axial direction, are formed in each of heat transmission pipes used in the absorber is characterized by comprising an absorber having heat transmission pipes for an absorber for cooling an absorption solution external to the pipes with cooling water internal to the pipes, wherein the convex portion and the concave portion adjacent thereto are each in the form of a curved surface, the curvature radius of the convex portion is made larger than the curvature radius of the concave portion, a groove having a smaller curvature radius than the curvature radius of the convex portion is formed in the bottom of the concave portion, and the absorption solution from the regenerator is dropped or sprayed onto the outer surface of the pipe.

According to a second aspect of the present invention, an absorption type refrigerating machine in which a refrigerating cycle is constituted by connecting an absorber, a regenerator, a condenser and an evaporator by pipes and a large number of protrusions, each consisting of a concave portion and a convex portion and extending in a pipe axial direction, are formed in each of heat transmission pipes used in the absorber is characterized by comprising an absorber having heat transmission pipes for an absorber for cooling an absorption solution external to the pipes with cooling water internal to the pipes, wherein the convex portion and the concave portion adjacent thereto are each in the form of a curved surface, the curvature radius of the convex portion is made smaller than the curvature radius of a transition portion from the convex portion to the concave portion, the curvature radius of the concave portion is made smaller than the curvature radius of the convex portion, and the absorption solution from the regenerator is dropped or sprayed onto the outer surface of the pipe.

According to a third aspect of the present invention, each protrusion on the outer surface of the pipe has a helix angle of 15° or less with respect to the axis of the pipe and the plurality of protrusions form a continuous curved surface.

According to a further aspect of the present invention, the concentrated absorption solution dropping onto the heat transmission pipe flows from the concave portion having a larger curvature radius than that of the convex portion over the convex portion to the next concave portion smoothly, the shifting of the absorption solution in the concave portion is thereby carried out smoothly, the concentrated absorption solution flows over the entire peripheral surface of the heat transmission pipe almost uniformly, Marangoni convections generated in the concave portion and the convex portion interfere with each other, a large turbulent function is thereby produced in a pipe axial direction, the heat exchange efficiency of the heat transmission pipe is greatly improved, the heat transmission pipe's cooling power of the concentrated absorption solution whose temperature is elevated by absorbing the refrigerant vapor is improved, the refrigerant vapor absorption power of the concentrated absorption solution is recovered, and the absorption amount of the refrigerant vapor is increased, thereby making it impossible to improve the cooling power of the evaporator and the operation efficiency of the absorption type refrigerating machine.

According to the first aspect of the present invention, the absorption solution enters the groove easily, thereby making it possible to increase the thickness of a liquid film in the groove and cause Marangoni convections easily.

According to the second aspect of the present invention, the absorption solution enters the concave portion having a small curvature radius easily, thereby making it possible to increase the thickness of the liquid film in the groove and cause Marangoni convections easily.

According to the third aspect of the present invention, which is inferior to the first and the second aspects of the invention, the concentrated absorption solution dropping onto the heat transmission pipe flows from the concave portion over the convex portion to the next concave portion smoothly, the shifting of the absorption solution in the concave portion is thereby carried out smoothly, the concentrated absorption solution flows over the entire peripheral surface of the heat transmission pipe almost uniformly, and Marangoni convections generated in the concave portion and the convex portion interfere with each other, a large turbulent function is thereby produced in a pipe axial direction, the heat exchange efficiency of the heat transmission pipe is greatly improved and the heat transmission pipe's cooling power of the concentrated absorption solution whose temperature is elevated by absorbing the refrigerant vapor is improved, the refrigerant vapor absorption power of the concentrated absorption solution is recovered, and the absorption amount of the refrigerant vapor is increased, thereby making it possible to improve the cooling power of the evaporator and the operation efficiency of the absorption type refrigerating machine.

According to the further aspect of the present invention, even when the convex portion of the heat transmission pipe is located at the uppermost position owing to the piping of the heat transmission pipes, the absorption solution dropping onto the convex portion is spread in a pipe axial direction by the groove formed in the convex portion and flows uniformly over almost the entire peripheral surface of the heat transmission pipe, thereby making it possible to improve heat exchange efficiency and refrigerant vapor absorption power.

According to the further aspect of the present invention, since the concentrated absorption solution flows over the convex portion having a helix angle formed on the outer surface of the heat transmission pipe more smoothly and drops onto the heat transmission pipe below while flowing in a pipe axial direction, the wettability of the heat transmission pipe is improved, and the cooling power of the heat transmission pipe is further improved, thereby making it possible to improve the refrigerant vapor absorption power of the absorber and the operation efficiency of the absorption type refrigerating machine.

BRIEF DESCRIPTION OF THE DRAWINGS

These and other objects and advantages of the present invention will become clear from the following description with reference to the accompanying drawings, wherein:

FIG. 3 is a front view of a heat transmission pipe;

DETAILED DESCRIPTION OF THE PREFERRED EMBODIMENTS

Figure 1:
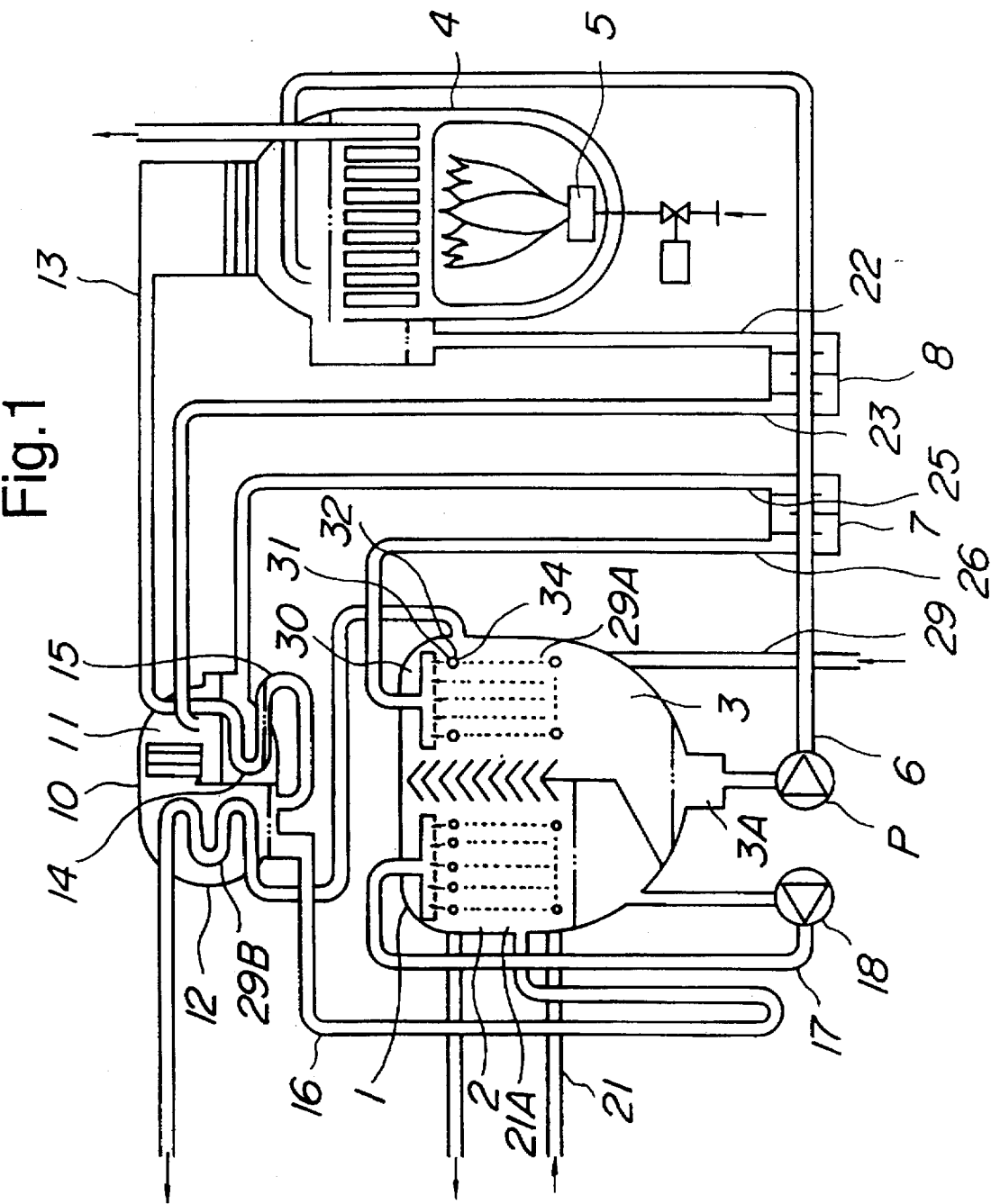
FIG. 1 is a schematic circuit diagram of an absorption type refrigerating machine.

A first embodiment of the present invention is described in detail hereinunder with reference to the accompanying drawings. In FIG. 1, reference numeral 1 is an evaporator/absorber barrel (lower barrel) in which an evaporator 2 and an absorber 3 are stored. Reference numeral 4 is a high-temperature regenerator equipped with a gas burner 5, for example, which is provided with a first absorption solution pump P, a low-temperature heat exchanger 7 and a high-temperature heat exchanger 8 along a diluted absorption solution pipe 6 which extends from an absorption solution reservoir 3A of the absorber 3 to the high-temperature regenerator 4.

Reference numeral 10 is a high-temperature barrel (upper barrel) in which a low-temperature regenerator 11 and a condenser 12 are stored. Numeral 13 is a refrigerant vapor pipe extending from the high-temperature regenerator 4 to the low-temperature regenerator 11, 14 is a heater provided in the low-temperature regenerator 11, and 15 is a refrigerant pipe extending from the heater 14 to the condenser 12. Numeral 16 is a refrigerant solution down-flow pipe extending from the condenser 12 to the evaporator 2, 17 is a refrigerant circulation pipe connected to the evaporator 2, and 18 is a refrigerant pump. Numeral 21 is a cold water pipe connected to the evaporator 2 and numeral 21A is an evaporator heat exchanger.

Numeral 22 is an intermediate absorption solution pipe extending from the high-temperature regenerator 4 to the high-temperature heat exchanger 8 and numeral 23 is an intermediate absorption solution pipe extending from the high-temperature heat exchanger 8 to the low-temperature regenerator 11. Numeral 25 is a concentrated absorption solution pipe extending from the low-temperature regenerator 11 to the low-temperature heat exchanger 7 and 26 is a concentrated absorption solution pipe extending from the low-temperature heat exchanger 7 to the absorber 3. Numeral at 29 is a cooling water pipe, 29A is an absorber heat exchanger, 29B is a condenser heat exchanger and 30 is a concentrated absorption solution spray unit provided above the absorber heat exchanger 29A.

Figure 2:
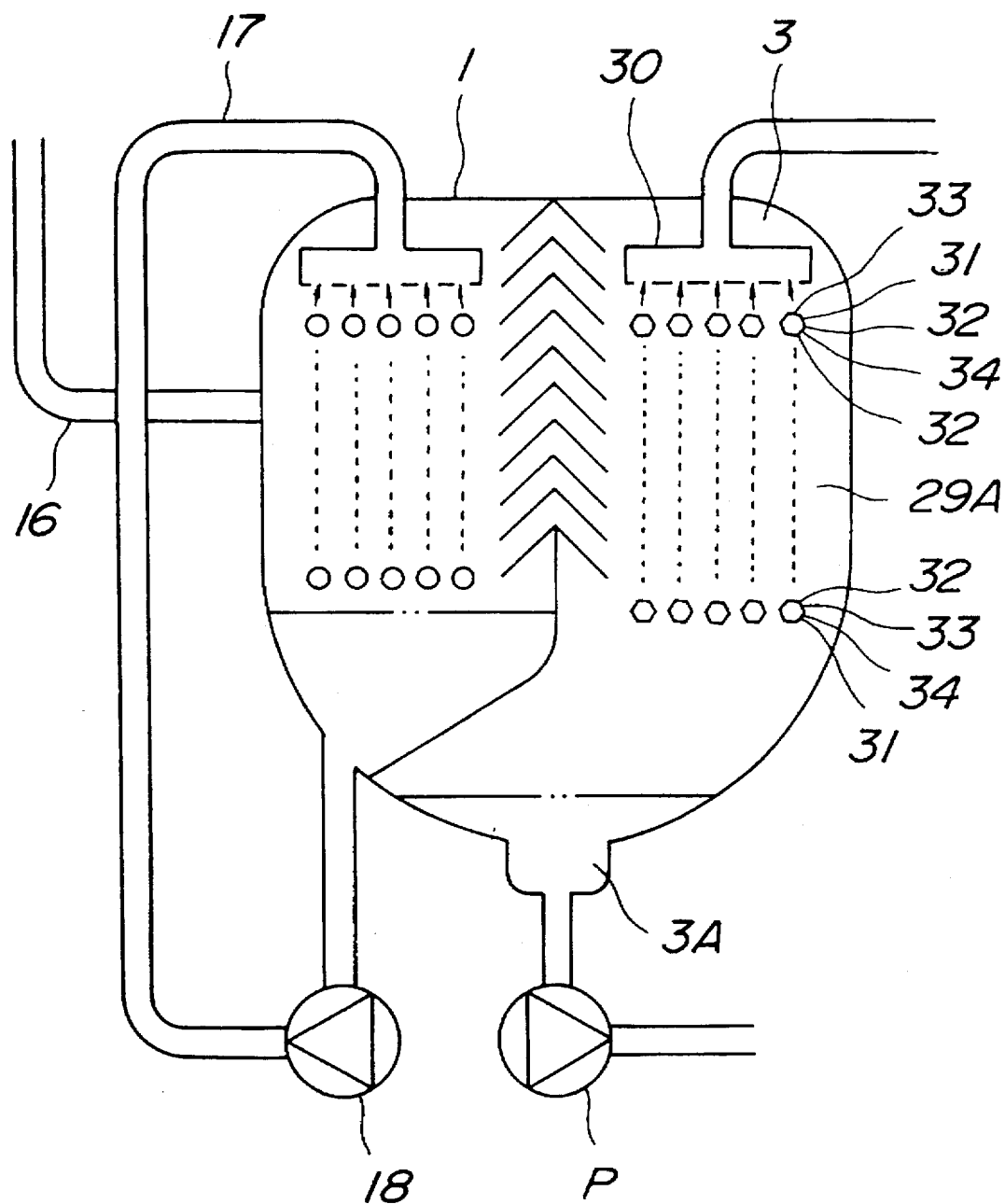
FIG. 2 is a sectional view of an evaporator/absorber barrel.
Figure 4A:
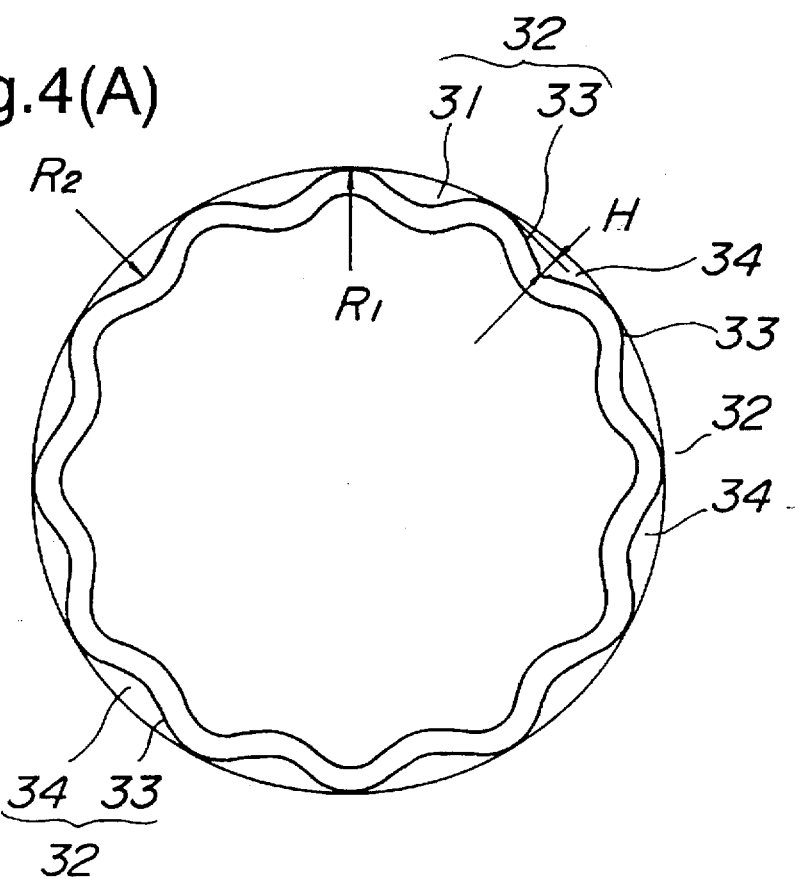
FIG. 4 (A) is a sectional view taken on line A—A of the heat transmission pipe shown in FIG. 3
FIG. 4(B) is a partially enlarged view of (A)

The absorber heat exchanger 29A consists of a plurality of heat transmission pipes 31 disposed in a plurality of stages in a substantially horizontal direction and a plurality of rows. The heat transmission pipe 31 is round in shape and equal, for example, 16 mm in diameter along the entire length. As shown in FIGS. 2 to 4, a large number of protrusions 32 are formed on the outer surface of the heat transmission pipe in a pipe axial direction. The number of convex portions 33 of the protrusions is set to 4 to 16. This number is optimally multiples of 3. In the case of the heat transmission pipe 31 having a diameter of 16 mm, the heat transmission pipe having 12 convex portions is easily fabricated.

The convex portion 33 of each protrusion 32 and a concave portion 34 between adjacent protrusions 32, 32 are in the form of a curved surface. The curvature radius R1 of the convex portion 33 is 1.5 mm, for example, and the curvature radius R2 of the concave portion 34 is 2.4 mm, for example. Therefore, the heat transmission pipe is fabricated such that the curvature radius of the concave portion is larger than the curvature radius of the convex portion and R2/R1 is larger than 1. In this respect, R2/R1 should be smaller than 4.

A groove 34A is formed in the bottom of the concave portion 34. This groove 34A has a circular arc cross section and its curvature radius is R3. The curvature radius R3 is smaller than the curvature radius R1 of the convex portion 33. The heat transmission pipe 31 is fabricated such that the height (H) of the convex portion 33 is less than 1.0 mm, for example, 0.7 mm, and the interval of the convex portions is about 4 mm, for example.

As shown in FIG. 3, pipe plate support portions (enlarged pipe portions) 31A, 31A having a smooth outer surface are formed at the both ends of the heat transmission pipe 31 and supported with pipe plates 1A, 1A of the low-temperature barrel 1 inserted into support holes 1a, 1a. A pipe support portion 31B having a smooth outer surface is formed at an intermediate portion (center) of the heat transmission pipe and supported with a support plate 1B inserted into a support hole 1b. 10 mm- and 50 mm-long imperfect protrusion portions 31C having formed thereon convex portions 33 whose height gradually decreases towards the pipe plate support portions 31A, 31A and the pipe support portion 31B are formed in the heat transmission pipe 31.

During the operation of the absorption type refrigerating machine constituted as described above, the gas burner 5 of the high-temperature regenerator 4 burns a diluted absorption solution such as an aqueous solution (containing a surfactant) of lithium bromide from the absorber 3, and refrigerant vapor is separated from the diluted absorption solution. The refrigerant vapor flows into the low-temperature regenerator 11 through the refrigerant vapor pipe 13. A refrigerant solution which is condensed by heating an intermediate absorption solution coming from the high-temperature regenerator 4 in the low-temperature regenerator 11 flows into the condenser 12. In the condenser 12, the refrigerant vapor from the low-temperature regenerator 11 is condensed and flows down into the evaporator 2 together with the refrigerant solution from the low-temperature regenerator 11. In the evaporator 2, the refrigerant solution is sprayed onto the evaporator heat exchanger 21A by the operation of the refrigerant pump 18. Thereafter, cold water whose temperature is lowered by cooling with the evaporator heat exchanger 21A is supplied to a load. The refrigerant vapor evaporated by the evaporator 2 flows into the absorber 3 and is absorbed into a concentrated absorption solution sprayed onto the absorber heat exchanger 29A.

The intermediate absorption solution whose concentration is increased by the separation of the refrigerant vapor in the high-temperature regenerator 4 flows into the low-temperature regenerator 11 through the intermediate absorption solution pipe 22, the high-temperature heat exchanger 8 and the intermediate absorption solution pipe 23.

The intermediate absorption solution is heated by the heater 14 through which the refrigerant vapor from the high-temperature regenerator 4 flows. The refrigerant vapor is separated from the intermediate absorption solution, whereby the concentration of the absorption solution is further increased.

Figure 6:
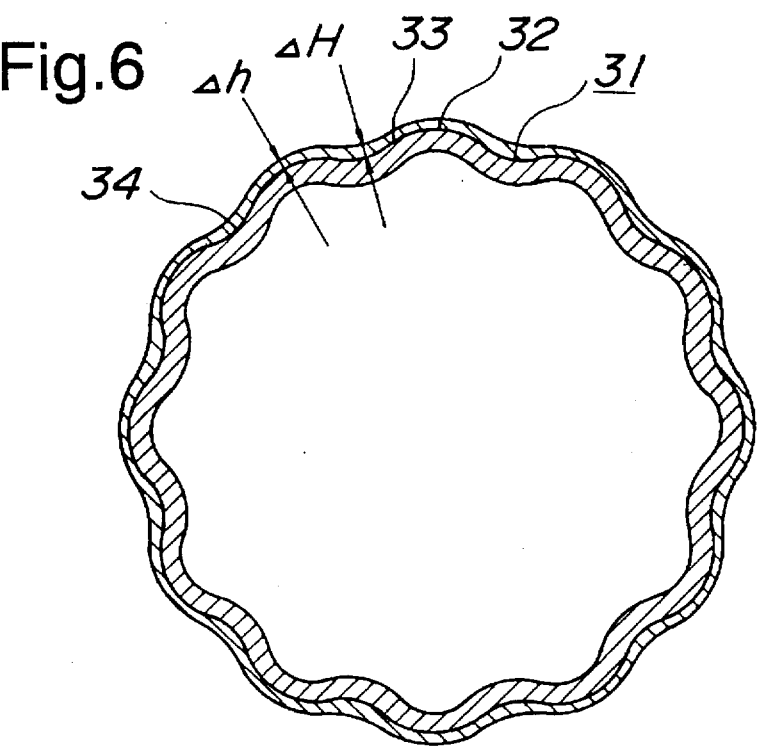
FIG. 6 is a sectional view of a heat transmission pipe having a film of an absorption solution formed on the outer surface thereof.

The concentrated absorption solution heated and condensed by the low-temperature regenerator 11 flows into the concentrated absorption solution pipe 25, goes to the absorber 3 through the low-temperature heat exchanger 7 and the concentrated absorption solution pipe 26 and drops down from the concentrated absorption solution spray unit (to be referred to as "spray unit" hereinafter) 30 onto the absorber heat exchanger 29A. When the concentrated absorption solution drops onto the heat transmission pipes 31 of the absorber heat exchanger 29A, it flows smoothly over the convex portion 33 of each protrusion 32 on the outer surface of each of the heat transmission pipes 31. A Marangoni convection, that is, a tension convection is generated in each concave portion 34 by a surface tension difference due to the concentration distribution of the liquid film surface of a surfactant. That is, as shown in FIG. 6, in each concave portion 34, the thickness ($\Delta H$) of a liquid film is large and a Marangoni convection in a pipe axial direction is strong. In each convex portion 33, the thickness ($\Delta H$) of the liquid film is small and a Marangoni convection in a pipe axial direction is weak. Marangoni convections in the convex portion 33 and the concave portion 34 interfere with each other, thereby generating a large turbulent function in a pipe axial direction.

Further, the curvature radius of the concave portion 34 is larger than the curvature radius of the convex portion 33, the concave portion 34 is in the form of a gently curved surface, the shifting of the concentrated absorption solution in the concave portion 34 is quick, and the movement of the concentrated absorption solution on the outer surface of the heat transmission pipe 31 is fast. A Marangoni convection is generated substantially uniformly over the entire peripheral surface of the heat transmission pipe 31.

The formation of the groove 34A increases the thickness of the liquid film in the groove 34A because the absorption solution can enter the groove 34A easily. This makes it easy to cause the interference between the above Marangoni convections.

Therefore, the amount of heat exchange in each of the heat transmission pipes 31 increases and the concentrated absorption solution flowing over the outer surface of the heat transmission pipe 31 is cooled. The refrigerant vapor flowing from the evaporator 2 to the absorber 3 is absorbed into the concentrated absorption solution flowing over the outer surface of the heat transmission pipe 31. The absorption solution (diluted absorption solution) whose concentration is diluted by absorbing the refrigerant vapor is supplied to the high-temperature regenerator 4 by the operation of a first absorption solution pump P.

According to the above embodiment of the present invention, when the concentrated absorption solution coming from the low-temperature regenerator 11 drops down onto the heat transmission pipes 31, the absorption solution on the outer surface of the pipe flows smoothly from the concave portion 34 having a larger curvature radius than that of the convex portion 33 formed into a curved surface to the next concave portion 34, the shifting of the absorption solution in the concave portion 34 is carried out smoothly, the absorption solution can flow uniformly over the entire peripheral surface of the heat transmission pipe, Marangoni convections generated in the convex portion 33 and the concave portion 34 interfere with each other, a large turbulent function is produced in a pipe axial direction, and the heat exchange efficiency of the heat transmission pipe 31 can be greatly improved. Therefore, since the heat transmission pipe 31's cooling power of the absorption solution whose temperature is elevated by absorbing the refrigerant vapor while it flows over the outer surface of the heat transmission pipe 31 can be improved and the absorption power of the refrigerant vapor can be restored, the amount of the refrigerant vapor absorbed by the absorber 3 increases and the amount of the refrigerant vapor generated by the evaporator 2 grows. As a result, the cooling power of the evaporator 2 can be improved and the operation efficiency of the absorption type refrigerating machine can be enhanced.

Further, when the interior surface of the pipe is curved in accordance with the exterior surface thereof, the adhesion of scale contained in cooling water to the interior surface of the pipe can be prevented and the interior of the pipe can be cleaned easily. As a result, the maintenance and inspection works of the absorption type refrigerating machine can be simplified.

Further, when the height of the convex portion 33 is larger than 1.5 mm, the absorption solution dropping onto the exterior of the heat transmission pipe 31 is liable to stay in the concave portion 34, thereby making difficult smooth shifting of the absorption solution. Therefore, the height of the protrusion is desirably set to 1.5 mm or less.

Since the pipe plate support portions 31A, 31A and the pipe support portion 31B having smooth surfaces are formed in the heat transmission pipe 31, the heat transmission pipe 31 can be supported by the pipe plate 1A, support plate 1B, pipe plate support portions 31A, 31A and pipe support portion 31B without fail. The gaps between the pipe plates 1A, 1A and the pipe plate support portions 31A, 31A can be sealed up by expanding the diameter of the pipes with certainty. Since the height of the convex portion 33 gradually decreases, cracking at the ends of the convex portion 33 and the concave portion 34 can be avoided.

Figure 4B:
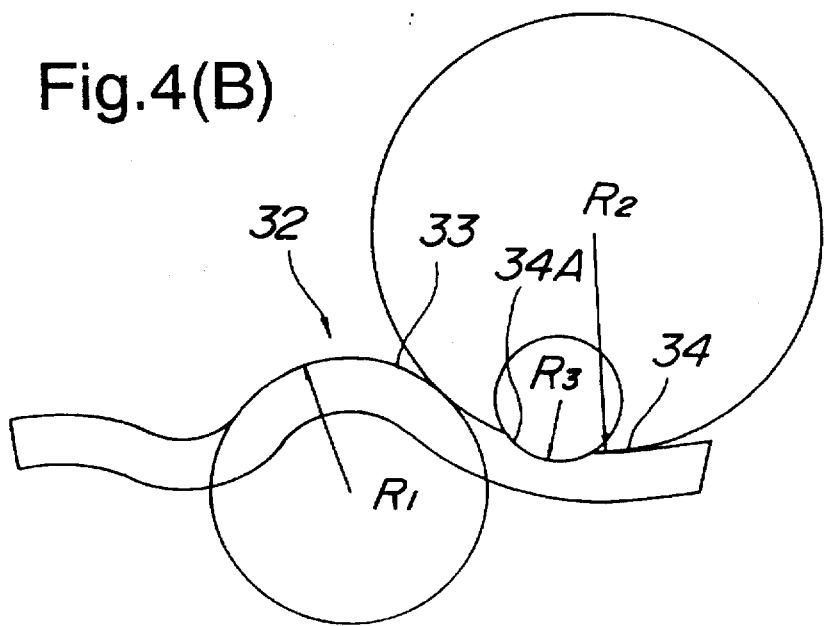
Figure 5A:
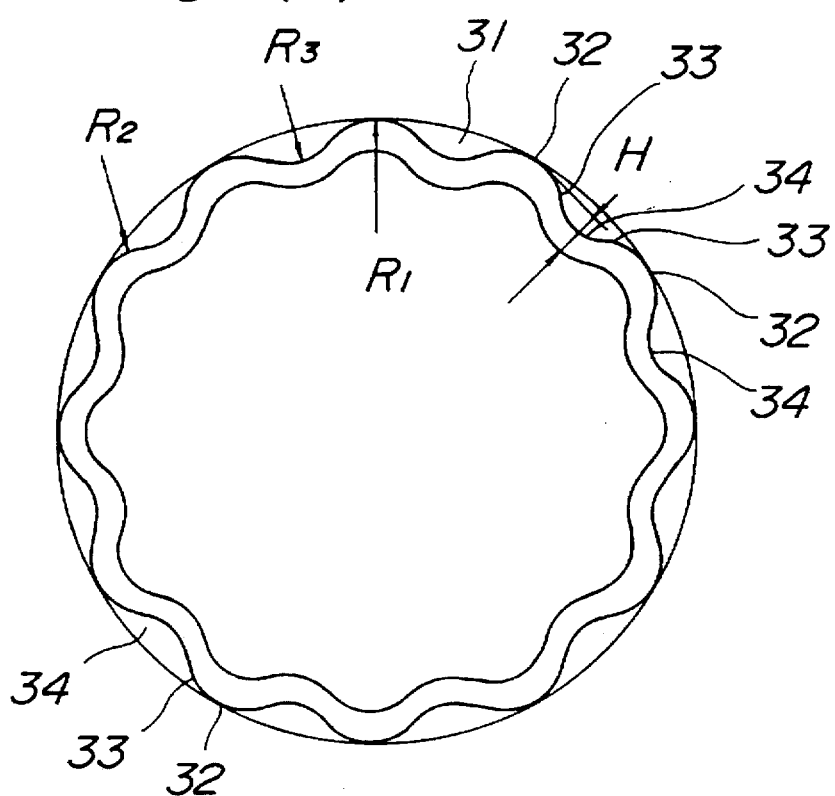
FIG. 5(A) is a sectional view taken on line A—A of a heat transmission pipe of another embodiment and FIG. 5(B) is a partially enlarged view of (A)
Figure 5B:
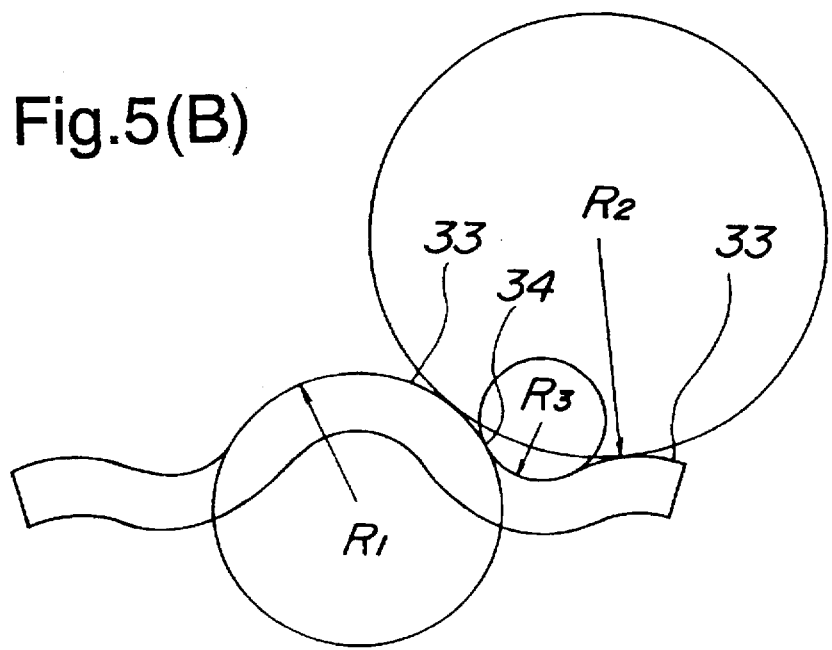

In the above embodiment, the groove 34A in the concave portion is formed rather angular (FIG. 4(B)), that is, the concave portion 34 and the groove 34A do not form a smooth curved continuous surface. However, like a second embodiment shown in FIG. 5, they can form a smooth curved continuous surface. That is, the curvature radius R2 of a transition portion from the convex portion 33 to the concave portion 34 is made larger than the curvature radius R1 of the convex portion. The curvature radius R3 of the concave portion 34 is made smaller than the curvature radius R1 of the convex portion 33.

The curvature radius R1 of the convex portion 33 is 1.5 mm, the curvature radius R2 of the transition portion from the convex portion 33 to the concave portion 34 is 2.4 mm, and the curvature radius R3 of the concave portion 34 is 0.6 mm. The concave portion 34 having such a small curvature radius is formed by contacting thereto the distal end of a presser jig used to form the convex portion 33 and the concave portion 34 of the heat transmission pipe for the absorber.

By setting the curvature radii R1, R2 and R3 to the above values, the absorption solution enters the concave portion 34 easily, becomes thicker than the thickness of the liquid film in the concave portion 34 and easily causes the same function as in the first embodiment, that is, the interference between the above Marangoni convections.

If the depth of the concave portion 34 is too large, the absorption solution collecting in the concave portion 34 may not flow over the next convex portion 33. Therefore, the depth of the concave portion 34 is made small.

Figure 12:
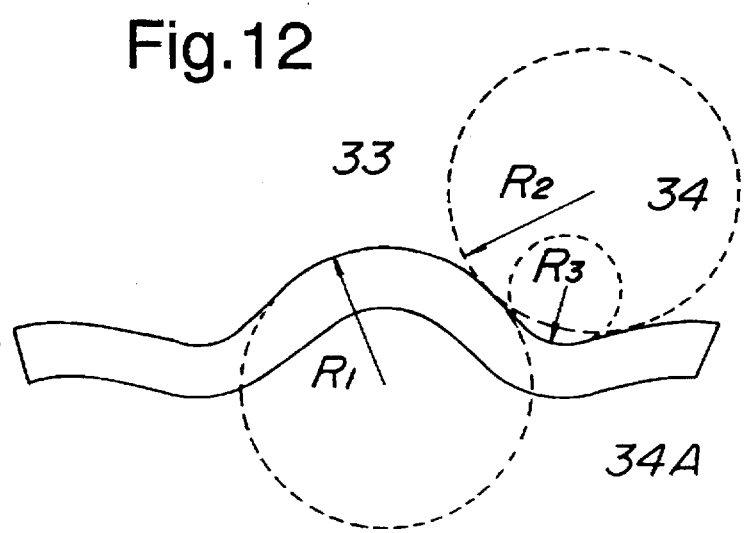
FIG. 12 is a sectional view of a heat transmission pipe of another embodiment.

In the above embodiments, the curvature radius R2 of the concave portion is much larger than the curvature radius R1 of the convex portion. As shown in FIG. 12, the curvature radius R1 of the convex portion and the curvature radius R2 of the concave portion may be made equal to each other. Alternatively, R2 may be made slightly smaller than R1. Although these cases are inferior in function and effect to the above embodiments, the concentrated absorption solution which is dropped onto the heat transmission pipe flows from the concave portion over the convex portion to the next concave portion smoothly if the function of the groove 34A is satisfactory. Therefore, the shifting of the absorption solution in the concave portion is carried out smoothly and the concentrated absorption solution flows over the entire peripheral surface of the heat transmission pipe almost uniformly.

Figure 13:
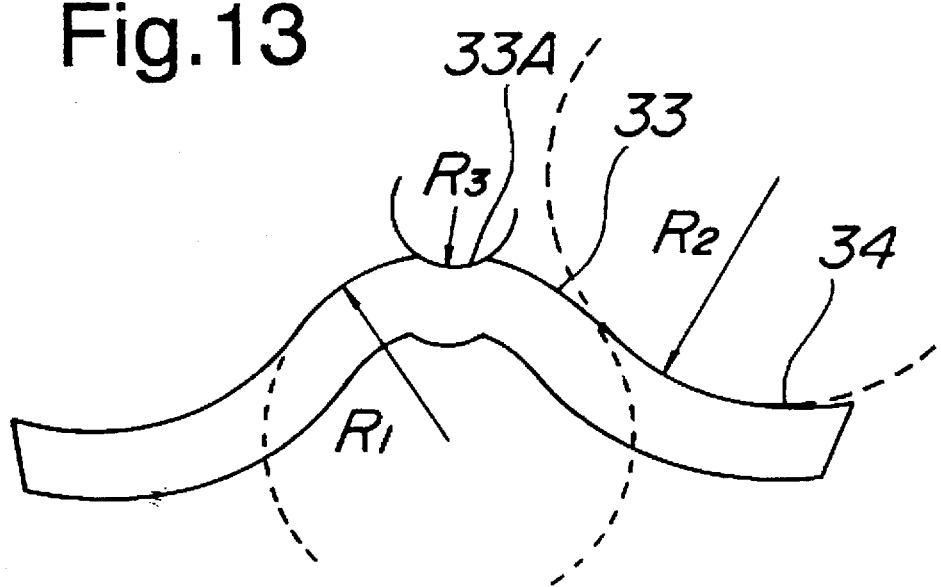
FIG. 13 is a sectional view of a heat transmission pipe of further another embodiment.

Although the groove 34A is formed in the concave portion 34 in the above embodiments (FIG. 4(B)), a groove 33A may be formed in the convex portion 33 as shown in FIG. 13 in another embodiment of the present invention. Owing to the function of this groove 33A, the dropping absorption solution spreads in a pipe axial direction and flows down over almost the entire peripheral surface of the heat transmission pipe uniformly. In addition, since the groove 33A is formed in the convex portion 33, the absorption solution dropping onto the convex portion spreads in a pipe axial direction and flows down over almost the entire peripheral surface of the heat transmission pipe uniformly even when the convex portion of the heat transmission pipe is located at the uppermost position owing to the piping of the heat transmission pipes, thereby making it possible to improve heat exchange efficiency and refrigerant vapor absorption power.

Figure 7:
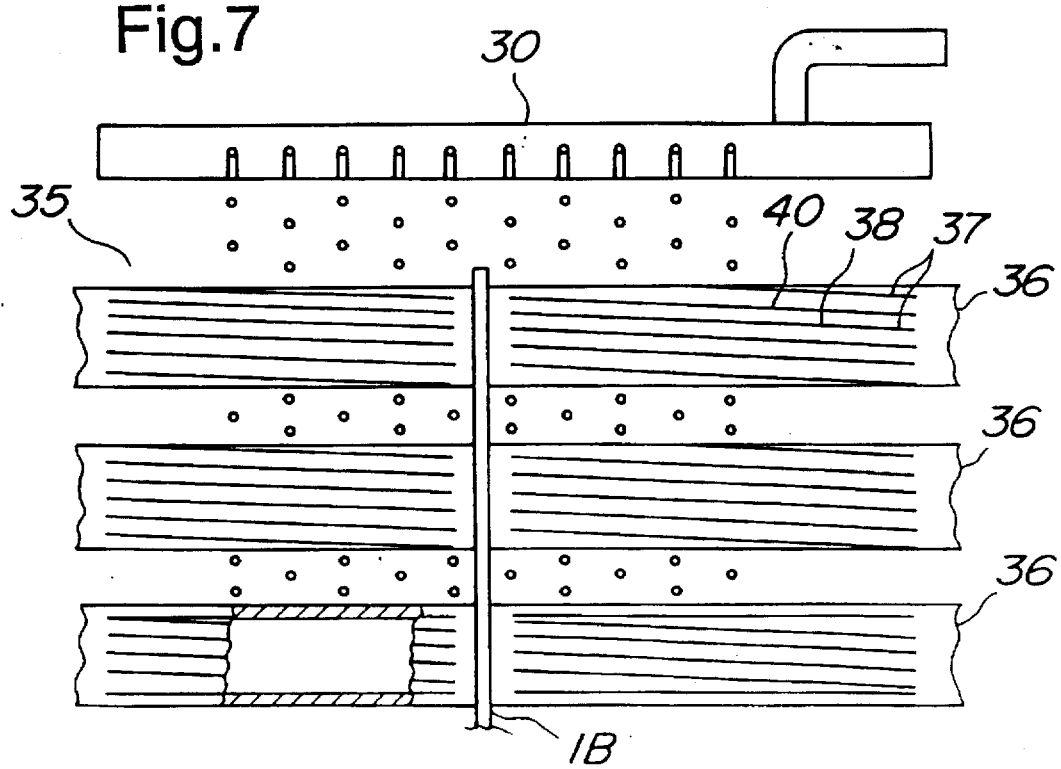
FIG. 7 is a schematic diagram of an absorber heat exchanger.
Figure 8:
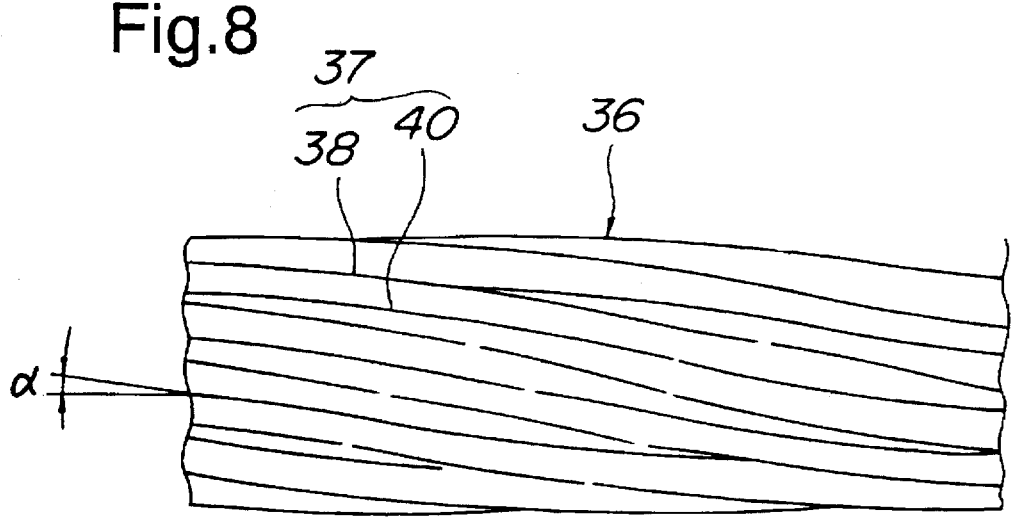
FIG. 8 is a partial front view of the heat transmission pipe of FIG. 7.

A third embodiment of the present invention is described hereinunder with reference to the accompanying drawings. In FIGS. 7 and 8, the same or corresponding elements as in the first embodiment are given the same reference symbols and their descriptions are omitted.

In FIG. 7, reference numeral 35 is a absorber heat exchanger arranged below the spray unit 30 of the absorber 3. The absorber heat exchanger 35 consists of a plurality of heat transmission pipes 36 disposed in a plurality of stages and a plurality of rows as in the above first embodiment. The outer surface of the heat transmission pipe 36 has a helix angle of $\alpha°$ (15° in the figure) which is 15° or less in a longitudinal direction, that is, a pipe axial direction as shown in FIG. 8, and has a plurality of protrusions 37 formed thereon in the pipe axial direction. A convex portion 38 and a concave portion 40 adjacent thereto of this protrusion 37 are each in the form of a curved surface. The heat transmission pipe 36 is formed such that the curvature radius of the convex portion 38 is 1.0 mm, for example, the curvature radius of the concave portion 40 is 1.5 mm, for example, that is, the curvature radius of the concave portion 40 is larger than that of the convex portion 38. The heat transmission pipe 36 is also formed such that the height of each protrusion is 1.5 mm or less, for example, 0.7 mm and the interval of adjacent protrusions 37 is about 4 mm, for example. The helix angle is 5°, for example. The relationship between the convex portion 38 and the concave portion 40 is made the same as that between the convex portion 33 and the concave portion 34 of FIG. 5. The groove 34A as shown in FIG. 4 may be formed in the concave portion 34 instead.

During the operation of the absorption type refrigerating machine comprising the absorber constituted as described above, the absorption solution and the refrigerant circulate in the same manner as in the absorption type refrigerating machine shown in the first embodiment. The concentrated absorption solution coming from the low-temperature regenerator drops down onto the heat transmission pipes 36 from the spray unit 30. The concentrated absorption solution flows over the convex portions 38 of the protrusions 37 on the outer surface of each of the heat transmission pipes 36 smoothly, and a Marangoni convection, that is, a tension convection caused by a surface tension difference due to the concentration distribution of the liquid film surface of a surfactant is generated in each concave portion 40.

That is, the Marangoni convection in a pipe axial direction is strong in each concave portion 40 and a Marangoni convection in a pipe axial direction is weak in each convex portion 38 as in the first embodiment. Therefore, the Marangoni convections in the convex portion 38 and the concave portion 40 interfere with each other, thereby producing a large turbulent function in a pipe axial direction.

Further, since the protrusion 37 has a helix angle, the concentrated absorption solution drops down along this helix angle. Therefore, as the total length of each of the heat transmission pipes 36 gets wet with the absorption solution and the absorption solution does not flow partially, an uniform Marangoni convection is generated in all of the heat transmission pipes.

When the concentrated absorption solution drops down over the outer surface of each of the heat transmission pipes 38, it absorbs the refrigerant vapor from the evaporator 2 and drops down onto the heat transmission pipe 36 of a lower stage. Therefore, the concentration of the absorption solution is reduced. The diluted absorption solution in the absorption solution reservoir 3A of the absorber 3 is provided to the high-temperature regenerator 4.

According to the above embodiment, the concentrated absorption solution dropping down onto the outer surface of the heat transmission pipe 36 flows from the concave portion 40 having a larger curvature radius than that of the convex portion 38 over the convex portion 38 formed into a curved surface to the next concave portion 40 smoothly, the shifting of the absorption solution in the concave portion 40 is carried out further smoothly owing to the helix angle, the absorption solution flows uniformly over the entire peripheral surface of the heat transmission pipe 36, thereby improving the wettability of the heat transmission pipes as a whole, and Marangoni convections generated in the convex portion 38 and concave portion 40 interfere with each other, thereby producing a large turbulent function in a pipe axial direction. Therefore, the heat exchange efficiency, that is, heat transmission performance of the heat transmission pipe 36 can be greatly improved. As a result, the refrigerant vapor absorption power of the absorption solution can be recovered by cooling the absorption solution whose temperature is elevated by absorbing the refrigerant vapor more efficiently, whereby the amount of the refrigerant vapor absorbed by the absorber 3 increases, thereby making it possible to enhance the performance of the absorber 3, and the amount of the refrigerant vapor generated by the evaporator 2 grows, thereby making it possible to improve the operation efficiency of the absorption type refrigerating machine.

Figure 9:
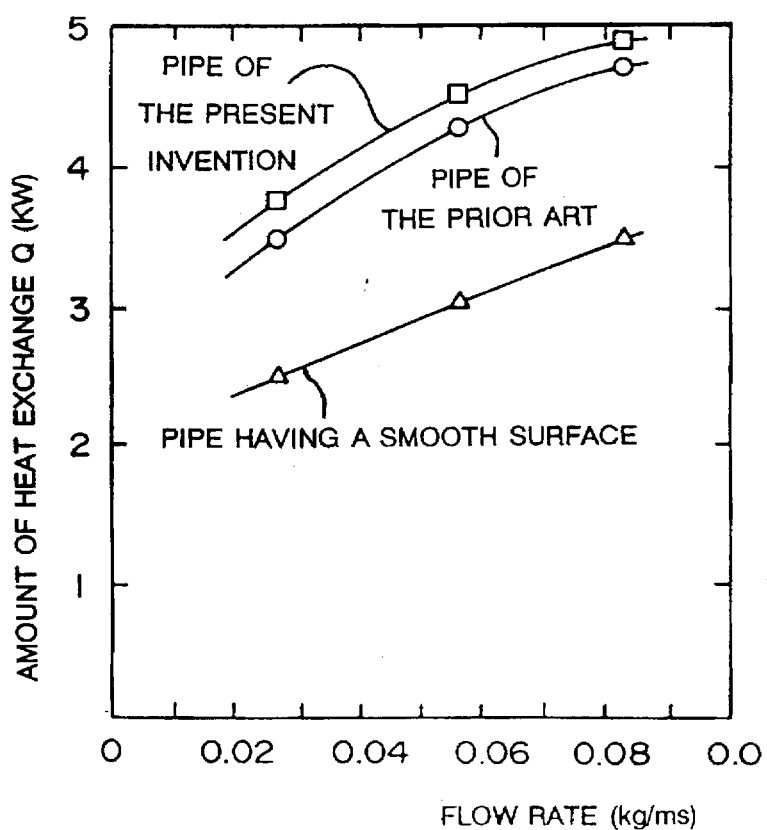
FIG. 9 is a diagram showing the relationship between the flow rate of the absorption solution and the amount of heat exchange.

In this respect, changes in the heat transmission performance of the heat transmission pipe 36 are such as shown in FIG. 9. FIG. 9 shows the amount of heat exchange when an aqueous solution of lithium bromide is sprayed at a rate of 0.66 Kg/ms. The amount of heat exchange was 43 KW in the prior art whereas it is 45 KW in the present invention. Therefore, the amount of heat exchange is improved by nearly 5%.

Figure 10:
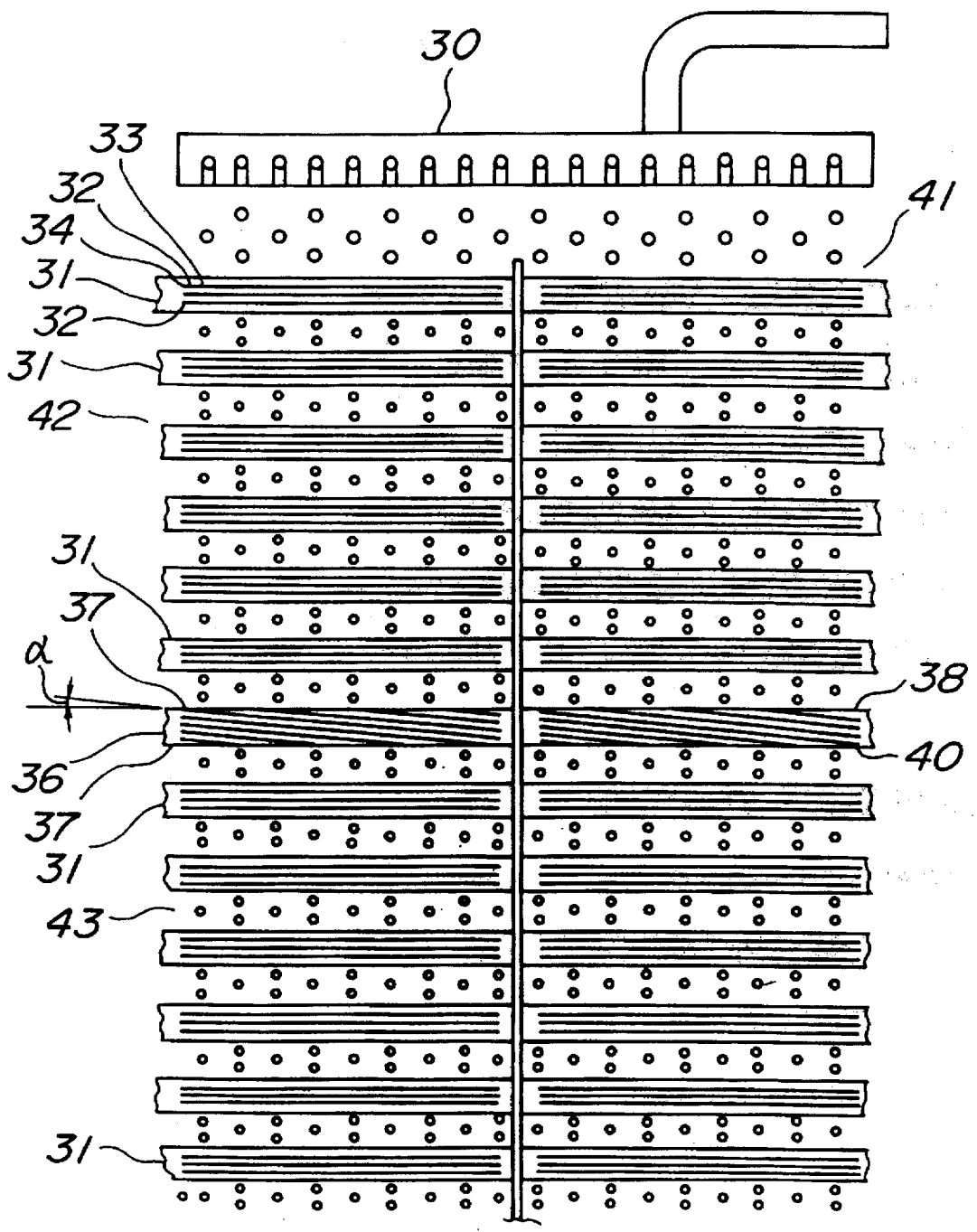
FIG. 10 is a schematic diagram of an absorber.
Figure 11:
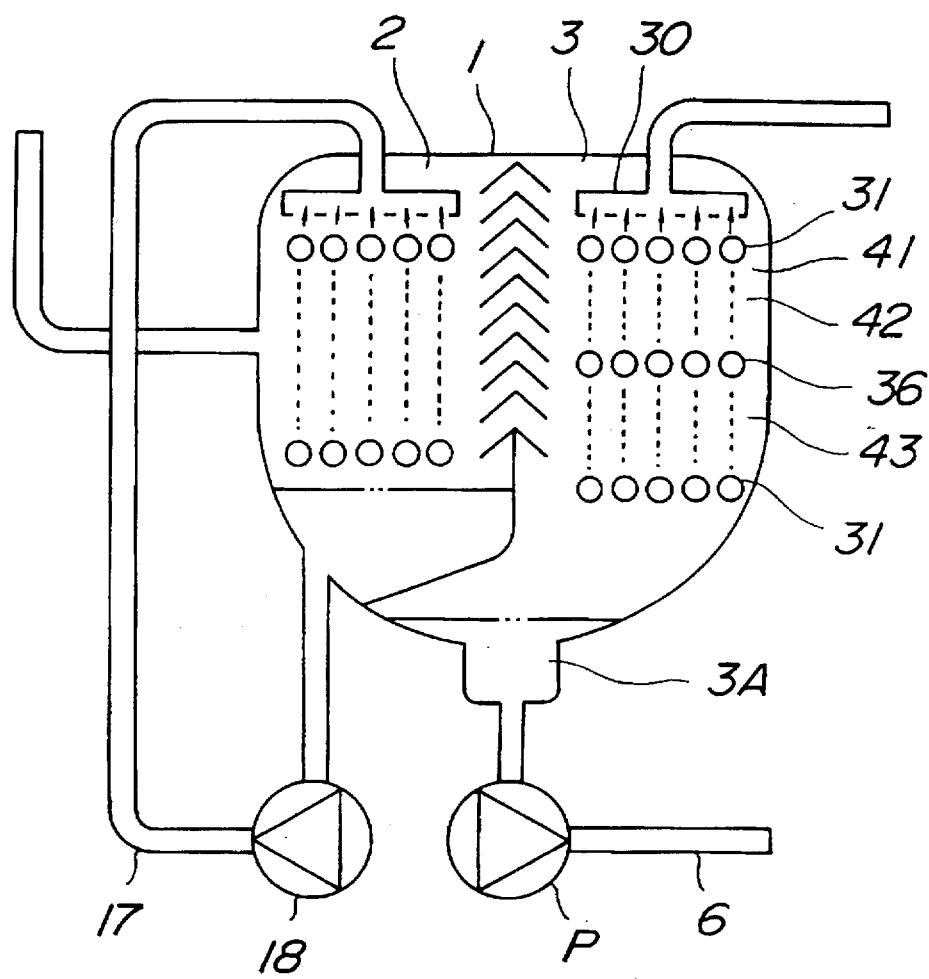
FIG. 11 is a sectional view of the evaporator/absorber barrel.

A fourth embodiment of the present invention is described hereinunder with reference to the accompanying drawings. FIGS. 10 and 11, the same and corresponding elements as in first, second and third embodiments are given the same reference codes and their descriptions are omitted.

Reference numeral 41 is an absorber heat exchanger arranged below the spray unit 30. The absorber heat exchanger 41 consists of heat transmission pipes of upper stages 42, heat transmission pipes of lower stages 43 and, for example, one heat transmission pipe 36 provided between the heat transmission pipes of these stages 42 and 43. The heat transmission pipes of these stages 42 and 43 are disposed in a plurality of stages and a plurality of rows.

During the operation of the absorption type refrigerating machine comprising the absorber constituted as described above, the absorption solution and the refrigerant circulate in the same manner as in the absorption type refrigerating machine of the first embodiment. The concentrated absorption solution coming from the low-temperature regenerator drops down onto the heat transmission pipes 31 of the upper stages 42 from the spray unit 30. The concentrated absorption solution dropped onto the heat transmission pipe 31 flows over the convex portion 33 of each protrusion 32 on the outer surface of the heat transmission pipe 31. In each concave portion 34, a Marangoni convection is generated and promotes heat exchange between cooling water running through the heat transmission pipe 31 and the absorption solution. The concentrated absorption solution which flows over the outer surface of the heat transmission pipe 31 and reaches the lower end drops down onto the heat transmission pipe 31 at the lower end uniformly and flows down from the heat transmission pipe 31 of an upper stage to the heat transmission pipe 31 of a lower stage in the same manner, during which the concentration of the concentrated absorption solution is gradually reduced by absorbing the refrigerant vapor. While the concentrated absorption solution drops down in this way, when the absorption type refrigerating machine is large in size, the absorber is also large in size, the heat transmission pipes 31, . . . , 36 are long, and part (for example, a right portion) of the heat transmission pipe 31 of an upper stage above the heat transmission pipe 36 is slightly curved downward, the concentrated absorption solution running over the outer surface of the heat transmission pipe 31 flows towards the right portion of the pipe. Therefore, the amount of the concentrated absorption solution dropping down from the right portion of the heat transmission pipe 31 is larger than that of the other portions, namely, central and left portions. In the heat transmission pipe 31 of a lower stage, as the amount of the concentrated absorption solution dropping from above to the right portion is large, the amount of the concentrated absorption solution dropping from the right portion is larger than the other portions.

Similarly, the amount of the absorption solution dropping from the heat transmission pipe 31 above the heat transmission pipe 36 of the intermediate stage is larger at the right portion of the heat transmission pipe 26 than that at the other central and left portions. Unlike the heat transmission pipes 31 of the upper stages, as shown in FIG. 7, a plurality of protrusions 37 having a helix angle are formed on the outer surface of the heat transmission pipe 36 and the convex portion 38 and the concave portion 40 have a helix angle like the protrusion 37. Therefore, the absorption solution dropping onto a left portion of the heat transmission pipe 36 is guided by each convex portion 38 and concave portion 40 and flows toward right and central portions of the heat transmission pipe 36. Since the torsion directions of the front and rear sides of the heat transmission pipe 36 differ from each other, the absorption solution dropping onto a right portion of the heat transmission pipe 36 flows toward a portion having a small amount of dropping and drops down from the lower end of the heat transmission pipe 36 almost uniformly. The absorption solution flows over the outer surface of the heat transmission pipe 31 below the heat transmission pipe 36 almost uniformly and drops down onto the heat transmission pipe 31 below the above heat transmission pipe 31 almost uniformly. Similarly, the absorption solution flows over the outer surface of each of the heat transmission pipes 31 almost uniformly, during which the concentration of the absorption solution is reduced by absorbing the refrigerant vapor, and the diluted absorption solution drops into the absorption solution reservoir 3A from the heat transmission pipe 31 of the last stage. Then, the diluted absorption solution in the absorption solution reservoir 3A is provided to the high-temperature regenerator 4.

According to the above embodiment, when the heat transmission pipe above the heat transmission pipe 36 of the intermediate stage is, for example, slightly curved, part thereof is bent downward, the absorption solution gathers in that portion, and the amount of the absorption solution dropping from the bent portion becomes large, the absorption solution dropping onto the heat transmission pipe 36 is guided by the convex portion 38 and the concave portion 40, and flows and is dispersed into a portion having a small amount of dropping because a plurality of protrusions 37 having a helix angle are formed on the outer surface of the heat transmission pipe 36 of the intermediate stage. Thus, the absorption solution drops down almost uniformly. And, the absorption solution flows from the heat transmission pipe 36 over the outer surface of each of the heat transmission pipes 31 of the lower stages almost uniformly, thereby making it possible to improve the heat transmission performance of the heat transmission pipes 31. As a result, even when the heat transmission pipes 31 are bent, the refrigerant vapor absorption power of the absorption solution can be recovered by cooling the absorption solution whose temperature is elevated by absorbing the refrigerant vapor by the heat transmission pipes 31, whereby the amount of the refrigerant vapor absorbed by the absorber 3 increases, thereby making it possible to enhance the performance of the absorber 3 and the operation power of the absorption type refrigerating machine.

Since the heat transmission pipe 36 having a helix angle is used in the intermediate stage and the heat transmission pipes 31 having no helix angle are used in the upper and lower stages, heat transmission pipe costs can be greatly reduced compared with the case where heat transmission pipes having a helix angle are used as the heat transmission pipes for the absorber 3. The heat transmission performance of the absorber can be enhanced by providing the heat transmission pipe 36 in the intermediate stage even when the outer surfaces of the heat transmission pipes 31 are smooth, thereby making it possible to improve the operation efficiency of the absorption type refrigerating machine.

When the number of stages of the heat transmission pipes 31 in the absorber shown in FIG. 10 is large (for example, 40 or more), heat transmission pipes 36 having a helix angle are provided at positions where the numbers of stages from the top are, for example, ⅓ and ⅔ the total number of stages. Like the above embodiments, even when the amount of the absorption solution dropping from the heat transmission pipe 31 of an upper stage above the heat transmission pipe 36 is large at a central portion of the heat transmission pipe 31, the absorption solution can be dropped from the heat transmission pipe 36 to the heat transmission pipe 31 below the heat transmission pipe 36 almost uniformly, whereby the same function and effect as those of the above embodiments can be obtained. When the number of stages of the heat transmission pipes 31 increases, the number of stages for providing the heat transmission pipes 36 is increased to three, for example, positions where the numbers of stages from the top are ¼, ½ and ¾ the total number of stages, whereby the same function and effect can be obtained. When the outer surfaces of the heat transmission pipes 31 are smooth and the number of stages of the heat transmission pipes is large, the heat transmission pipes 36 are provided at a plurality of positions as described above, whereby the same function and effect can be obtained.

As described on the foregoing pages, according to the present invention, since there is provided an absorber having heat transmission pipes for an absorber in which a convex portion of a protrusion formed on the outer surface thereof in a longitudinal direction and a concave portion adjacent thereto are in the form of a curved surface and the curvature radius of the concave portion is made larger than that of the convex portion, the absorption solution dropping onto the outer surface of each of the heat transmission pipes flow from the concave portion over the convex portion to the next concave portion smoothly, the shifting of the absorption solution in the concave portion is carried out smoothly, the absorption solution can flow over the entire peripheral surface of the heat transmission pipe uniformly, Marangoni convections generated in the convex portion and concave portion interfere with each other, and a strong turbulent function is produced in a pipe axial direction, whereby the heat exchange efficiency, that is, heat transmission performance of the heat transmission pipe can be enhanced, the refrigerant vapor absorption power of the absorber can be increased, and the amount of the refrigerant vapor generated by the evaporator increases, thereby making it possible to improve the cooling power and the operation efficiency of the absorption type refrigerating machine.

Further, according to the present invention, since a groove having a smaller curvature radius than that of the convex portion is formed in the bottom of the concave portion, the absorption solution enters the groove easily, thereby making it possible to increase the film thickness in the groove and cause the interference between Marangoni convections with ease.

Further, according to the present invention, the curvature radius of the transition portion from the convex portion to the concave portion is made larger than the curvature radius of the convex portion, the curvature radius of the concave portion is made smaller than the curvature radius of the convex portion, and the absorption solution enters the concave portion easily, thereby making it possible to increase the film thickness in the groove and cause the interference between Marangoni convections with ease.

According to the present invention claimed in, the concentrated absorption solution dropping onto the heat transmission pipe flows from the concave portion over the convex portion to the next concave portion smoothly, whereby the shifting of the absorption solution in the concave portion is carried out smoothly, the concentrated absorption solution flows over the entire peripheral surface of the heat transmission pipe almost uniformly, Marangoni convections generated in the convex portion and the concave portion interfere with each other, and a large turbulent function is thereby produced in a pipe axial direction, whereby the heat exchange efficiency of the heat transmission pipe is greatly improved, the heat transmission pipe's cooling power of the concentrated absorption solution whose temperature is elevated by absorbing the refrigerant vapor is enhanced, the refrigerant vapor absorption power of the concentrated absorption solution is recovered, and the absorption amount of the refrigerant vapor is increased, thereby making it possible to improve the cooling power of the evaporator and the operation efficiency of the absorption type refrigerating machine.

Since the curvature radii of the convex portion and the concave portion are almost equal, the production of the heat transmission pipe is relatively easy.

According to the present invention claimed in claim 4, even when the convex portion of the heat transmission pipe is located at the uppermost position owing to the piping of the heat transmission pipes, the absorption solution dropping onto the convex portion is spread in a pipe axial direction by a groove formed in the convex portion, flows over almost the entire peripheral surface of the heat transmission pipe uniformly, thereby improving heat exchange efficiency and refrigerant vapor absorption power.

Further, according to the present invention, since a plurality of protrusions having a helix angle of 15° or less are formed on the outer surface of the heat transmission pipe, the absorption solution flows from the concave portion over the convex portion to the next concave portion smoothly, the shifting of the absorption solution in the concave portion is carried out smoothly, Marangoni convections generated in the concave portion and the convex portion interfere with each other, a strong turbulent function is thereby produced in a pipe axial direction, and the absorption solution flows in a pipe axial direction down onto the heat transmission pipe below due to the helix angle of the outer surface of the pipe, thereby making it possible to improve the wettability of the heat transmission pipe. As a result, the heat transmission performances of all the heat transmission pipes are greatly improved and the refrigerant vapor absorption power of the absorber can be enhanced.

What is claimed is:

1. An improved absorption type refrigerating machine comprising an absorber having at least one heat transmission pipe for cooling an absorption solution external to each heat transmission pipe with cooling water internal to each heat transmission pipe, wherein each heat transmission pipe has a plurality of protrusions formed on the outer surface thereof, wherein each protrusion comprises a convex portion and a concave portion, and wherein the convex portion and the concave portion extend continuously in an axial direction along a corresponding heat transmission pipe, the improvement comprising:

a groove formed in the bottom of each concave portion extending continuously in an axial direction along a corresponding heat transmission pipe for increasing interference in Marangoni convections in the absorption solution external to the corresponding heat transmission pipe.

2. The improved absorption type refrigerating machine as defined in claim 1, wherein the convex portion has a curvature radius of R1, the concave portion has a curvature radius of R2, and the groove has a curvature radius of R3, wherein the curvature radius R1 is smaller than the curvature radius R2, and wherein the curvature radius R3 is smaller than the curvature radius R1.

3. The improved absorption type refrigerating machine as defined in claim 1, wherein each protrusion has a helix angle of 15° or less and the plurality of protrusions form a continuous curved surface.

4. An improved absorption type refrigerating machine comprising an absorber having at least one heat transmission pipe for cooling an absorption solution external to each heat transmission pipe with cooling water internal to each heat transmission pipe, wherein each heat transmission pipe has a plurality of alternating convex and concave portions formed along the outer circumferential surface thereof, and wherein the convex and concave portions extend continuously in an axial direction along a corresponding heat transmission pipe, the improvement comprising:

a groove formed in the bottom of each concave portion extending continuously in an axial direction along a corresponding heat transmission pipe for increasing interference in Marangoni convections in the absorption solution external to the corresponding heat transmission pipe.

5. The improved absorption type refrigerating machine as defined in claim 4, wherein each convex portion has a curvature radius of R1, each concave portion has a curvature radius of R2, and each groove has a curvature radius of R3, wherein the curvature radius R1 is smaller than the curvature radius R2, and wherein the curvature radius R3 is smaller than the curvature radius R1.

6. The improved absorption type refrigerating machine as defined in claim 4, wherein each convex and concave portion has a helix angle of 15° or less and the plurality of alternating convex and concave portions form a continuous curved surface.

7. An improved absorption type refrigerating machine comprising an absorber having at least one heat transmission pipe for cooling an absorption solution external to each heat transmission pipe with cooling water internal to each heat transmission pipe, wherein each heat transmission pipe has a plurality of protrusions formed on the outer surface thereof, wherein each protrusion comprises a convex portion and a concave portion, and wherein the convex portion and the concave portion extend continuously in an axial direction along a corresponding heat transmission pipe, the improvement comprising:

a groove formed in the top of each convex portion extending continuously in an axial direction along a corresponding heat transmission pipe for increasing interference in Marangoni convections in the absorption solution external to the corresponding heat transmission pipe.

8. The improved absorption type refrigerating machine as defined in claim 7, wherein the convex portion has a curvature radius of R1, the concave portion has a curvature radius of R2, and the groove has a curvature radius of R3, wherein the curvature radius R1 is smaller than the curvature radius R2, and wherein the curvature radius R3 is smaller than the curvature radius R1.

9. The improved absorption type refrigerating machine as defined in claim 7, wherein each protrusion has a helix angle of 15° or less and the plurality of protrusions form a continuous curved surface.

10. An improved absorption type refrigerating machine comprising an absorber having at least one heat transmission pipe for cooling an absorption solution external to each heat transmission pipe with cooling water internal to each heat transmission pipe, wherein each heat transmission pipe has a plurality of alternating convex and concave portions formed along the outer circumferential surface thereof, and wherein the convex and concave portions extend continuously in an axial direction along a corresponding heat transmission pipe, the improvement comprising:

a groove formed in the top of each convex portion extending continuously in an axial direction along a corresponding heat transmission pipe for increasing interference in Marangoni convections in the absorption solution external to the corresponding heat transmission pipe.

11. The improved absorption type refrigerating machine as defined in claim 10, wherein each convex portion has a curvature radius of R1, each concave portion has a curvature radius of R2, and each groove has a curvature radius of R3, wherein the curvature radius R1 is smaller than the curvature radius R2, and wherein the curvature radius R3 is smaller than the curvature radius R1.

12. The improved absorption type refrigerating machine as defined in claim 10, wherein each convex and concave portion has a helix angle of 15° or less and the plurality of alternating convex and concave portions form a continuous curved surface.

* * * * *

UNITED STATES PATENT AND TRADEMARK OFFICE
CERTIFICATE OF CORRECTION

PATENT NO. : 5,730,001
DATED : March 24, 1998
INVENTOR(S) : Masahiro Furukawa

It is certified that error appears in the above-identified patent and that said Letters Patent is hereby corrected as shown below:

Column 4, line 27, "14 is" should read --numeral 14 is--.

Column 4, line 28, "and 15 is" should read --numeral 15 is--.

Column 4, line 31, "17 is" should read --numeral 17 is--.

Column 4, line 33, "and 18 is" should read --and numeral 18 is--.

Column 4, line 43, "26" should read --numeral 26--.

Column 4, line 46, "Numeral at 29" should read --Numeral 29--.

UNITED STATES PATENT AND TRADEMARK OFFICE
CERTIFICATE OF CORRECTION

PATENT NO. : 5,730,001
DATED : March 24, 1998
INVENTOR(S) : Masahiro Furukawa

It is certified that error appears in the above-identified patent and that said Letters Patent is hereby corrected as shown below:

Column 4, line 46, "29A" should read --numeral 29A--.

Column 4, line 47, "29B" should read --numeral 29B--.

Column 4, line 47, "30" should read --numeral 30--.

Column 7, line 19, "pipe plate 1A" should read --pipe plates 1A, 1A,--.

Column 12, line 44, "invention claimed in, the" should read --invention, the--.

Signed and Sealed this

Second Day of February, 1999

Attest:

Attesting Officer

Acting Commissioner of Patents and Trademarks